DEVICE FOR IDENTIFICATION OF NUMBERS

Filed Feb. 10, 1953

INVENTOR
KARL GEORG JOHNSON
BY Frederick E. Hane
ATTORNEY

United States Patent Office 2,732,434

Patented Jan. 24, 1956

2,732,434

DEVICE FOR IDENTIFICATION OF NUMBERS

Karl Georg Johnson, Stockholm, Sweden, assignor to Telefonaktiebolaget L M Ericsson, Stockholm, Sweden, a Swedish company Application February 10, 1953, Serial No. 336,175

Claims priority, application Sweden February 25, 1952

7 Claims. (Cl. 179—18)

In automatic telephone installations devices are often needed which are rendered operative when the call number of a certain line or group of lines is registered in a registering device. When these numbers consist of many digits, for instance 5 or 7 digits, it is difficult to identify them swiftly and at a moderate cost by means of registering devices as heretofore known, containing a registering member for each digit.

Accordingly, the principal object of the invention is to provide novel and improved means which permit identification of a multiple digit call number by an inexpensive and rapidly operating device.

The aforesaid object and other objects, features and advantages of the invention are attained by providing in an automatic telephone system registering means for registering a multiple digit call number, said registering means including a plurality of electric registering mechanisms each associated with one digit of the call number, electromagnetic relay means, electric control means controlled by the energization of said relay means, and control circuit means for connecting said registering means with said relay means in an energizing circuit, the said control means including several preparatory circuits each controlled by a registering mechanism registering its associated digit, completion of all said preparatory circuits completing said energizing circuits for the relay means.

The invention will be described in conjunction with the accompanying drawing.

Figure 1:
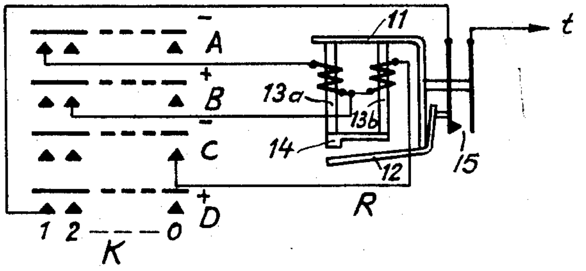
Fig. 1 shows a relay intended to supervise calls to or from a 4-digit number.

The invention is shown in its simplest embodiment in Fig. 1, where K is a registering device containing four register units A, B, C and D, each registering a digit in a 4-digit number. The purpose is to produce a signal when a certain number is registered in the registering device K. In the figure the number is supposed to be 1201 and the signal is effected by actuating a relay R closing a control circuit *t*. Relay R is shown as comprising two electromagnets each including a core 13*a* and 13*b* respectively supporting exciting coils. The coil on core 13*a* is connected with registering mechanism A in an energizing circuit including a switch contact closed by the mechanism when the same registers the digit associated with it. Similarly the coil on core 13*b* is connected in an energizing circuit with registering mechanism B through a switch contact closed when mechanism B registers its digit number. Cores 13*a* and 13*b* are magnetically coupled on one end by a relay bridge or pole piece 11 and at the other end by a yoke or pole piece 14. Bridge 11 supports a relay armature 12 which coacts with yoke 14. This armature when attracted closes a switch contact 15 in control circuit *t* which also includes a switch contact closed by mechanism D when this mechanism registers its digit. Switch contact 15 is supported on bridge 11. The digits 1 and 2 are registered by the units A and B, a circuit is closed through the coil on the iron core 13*a*. Thus a magnetic field is formed which closes over the yoke 14, the core 13*b* and the relay bridge 11 without attracting the armature 12. When the unit C registers the digit 0, the coil on the core 13*b* will be energized whereby the current direction through the coils is such that the magnetic field produced by the core 13*b* changes direction and closes through the armature 12, which is now attracted towards the yoke 14. As soon as the unit D registers the digit 1, the control circuit *t* is closed.

Figure 2:
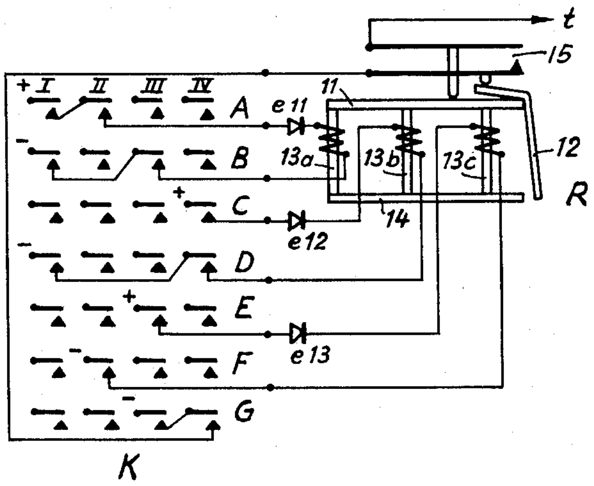
Fig. 2 shows the application of the invention for supervision of a 7-digit number.

The principle shown in Fig. 1 may be carried further as shown in Fig. 2. The registering device K in this figure comprises seven sets A–G having each four relays I–IV. Each relay set registers a digit by operating one or two relays in a known manner. If the combinations I, II, III, IV, I–II, I–III, I–IV, II–III, II–IV and III–IV correspond to the digits 1–9, 0 the number 5.647.320 is registered. The relay R comprises in this case three cores 13*a*, 13*b* and 13*c*, bridge 11 with armature 12 and yoke 14. When the digits 5 and 6 have been registered, a circuit is closed through the rectifier *e*11 and the coil on the iron core 13*a*. Thus a magnetic field is formed which closes through the yoke 14, the cores 13*b* and 13*c* and the bridge 11 without attracting the armature 12. After the digits 4 and 7 have been dialled, a circuit is closed through the rectifier *e*12 and the coil on the core 13*b*. The field generated by the core 13*b* changes direction but joins with the field produced by the core 13*a* through the iron core 13*c* without attracting the armature 12. Only after the digits 3 and 2 have been registered and a further circuit is closed through the rectifier *e*13 and the coil on the core 13*c* the field produced by the core 13*c* will also change direction and all magnetic fields close over the armature 12, which is attracted towards the yoke 14. When the last digit 0 has been registered on the unit G, the control circuit *t* is closed.

Figure 3:
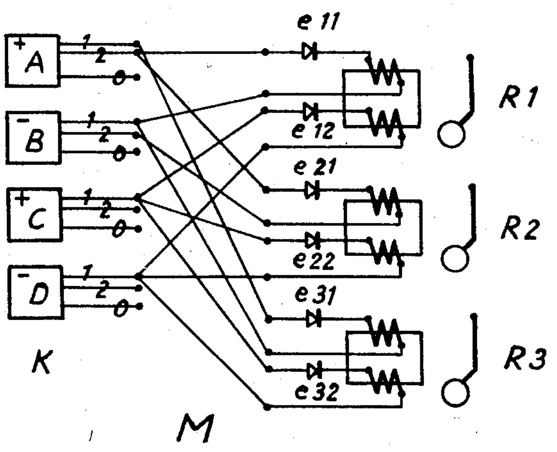
Fig. 3 shows how a number of telephone numbers may be supervised simultaneously.

The rectifiers *e*11–*e*13 are necessary only if several relays R are connected to the same registering device K as is shown in Fig. 3.

The invention is particularly suitable for use in automatic telephone exchanges with markers in which there are only one or a few sets of marking wires and which are common for each a large number of subscriber's lines. Thus the invention may be applicable for instance to mark P. B. X-numbers, lines which are to be supervised by an operator, statistical devices, call metering etc. Fig. 3 shows the invention being applied to conversation meters in a telephone exchange with a 4-digit numbering. Each meter R1–R3 has a relay system as has been described as relay R in Fig. 1. The registering device K is supposed to pertain to a marker, from which forty marking wires, marked 1, 2–0, lead to an intermediate frame M. To each conversation meter R1–R3 is associated with two rectifiers *e*11–*e*12, *e*21–*e*22 or *e*31–*e*32. When the number 2111 is registered the meter R1 is actuated, when the number 2211 is registered the meter R2 and when the number 1111 is registered the meter R3.

I claim:

1. In an automatic telephone system, registering means for registering a multiple digit call number, said registering means including a plurality of electric registering mechanisms one for registering each digit of the call number, electromagnetic relay means, electric control means controlled by the energization of said relay means, and control circuit means for connecting said registering means with said relay means in an energizing circuit, the said control circuit means including several preparatory circuits each controlled by a registering mechanism registering its digit, completion of all said preparatory circuits completing said energizing circuit for the relay means.

2. In an automatic telephone system, registering means for registering a multiple call number, said registering means including a plurality of registering mechanisms one for registering each digit of said call number, electromagnetic relay means, electric control means controlled by the energization of said relay means, first control circuit means for connecting said registering mechanisms except one with said relay means in an energizing circuit, the said control circuit means including several preparatory circuits each controlled by one of said connected registering mechanisms registering its digit, completion of all said preparatory circuits completing said energizing circuit for the relay means, and second control circuit means controlled by the remaining one of said registering mechanisms registering its digit thereby completing the call number and controlling said control means for actuating the same when the call number is completed.

3. In an automatic telephone system, registering means for registering a multiple call number, said registering means including a plurality of registering mechanisms one for registering each digit of said call number, relay means including at least two electromagnetic means each having a magnetic core and a coil thereon, a first magnetic pole piece magnetically coupling the juxtaposed core faces on one end of said cores, a second magnetic pole piece magnetically coupling the opposite juxtaposed core faces and a movable armature supported by said first pole piece and engageable with said second pole piece, an energizing circuit for each of said coils, each of said circuits including a switch contact, the said switch contacts being individually closed by said registering mechanisms registering the respective digits, closing of all said switch contacts completing said energizing circuit for the relay means, and control means controlled by the energization of said relay means.

4. An automatic telephone system according to claim 3, wherein the winding direction of said coils and the flow direction of the current in said energization circuits are such that a magnetic flux effecting attraction of said armature is generated only upon excitation of all the coils of the relay means in response to closing of all the switch contacts in said energizing circuits.

5. An automatic telephone system according to claim 3, wherein the said control means comprise counter circuit means mounted on said first pole piece and operated by the attraction of said armature.

6. An automatic telephone system according to claim 3 and also comprising a control circuit for further controlling said control means, the said control circuit including at least one switch contact controlled by a registering mechanism registering its digit, the said registration completing the registration of the call number and a switch contact controlled by the attraction of said armature, completion of the said control circuit by closing of the switch contacts included therein effecting activation of the control means.

7. An automatic telephone system according to claim 3 and further comprising an additional one of said relay means, the coils of said additional relay means being each connected in an energizing circuit including a switch contact controlled by one of said registering mechanisms and further including a rectifying means connected in series with the respective relay coil.

No references cited.